(12) United States Patent
McGregor et al.

(10) Patent No.: US 9,044,005 B2
(45) Date of Patent: Jun. 2, 2015

(54) REMOTE CONTROLLED TARGET SUPPORTING DEVICE AND CARGO CARRIER

(76) Inventors: Wayne A. McGregor, Pinckney, MI (US); Daniel D. Orr, Paw Paw, MI (US)

( * ) Notice: Subject to any disclaimer, the term of this patent is extended or adjusted under 35 U.S.C. 154(b) by 538 days.

(21) Appl. No.: 13/199,227

(22) Filed: Aug. 24, 2011

(65) Prior Publication Data

US 2012/0053758 A1    Mar. 1, 2012

Related U.S. Application Data

(60) Provisional application No. 61/377,687, filed on Aug. 27, 2010.

(51) Int. Cl.
  A63B 63/00    (2006.01)
  A63B 67/00    (2006.01)
  A01M 31/06    (2006.01)

(52) U.S. Cl.
  CPC ...................................... A01M 31/06 (2013.01)

(58) Field of Classification Search
  USPC .................. 273/359, 367, 406–407; 717/106;
    701/2; 29/428; 238/10 E; 446/279–283,
    446/454, 456
  See application file for complete search history.

(56) References Cited

U.S. PATENT DOCUMENTS

| | | | |
|---|---|---|---|
| 2,427,010 A * | 9/1947 | Lohr .............................. | 273/406 |
| 3,689,927 A | 9/1972 | Boston | |
| 4,416,456 A * | 11/1983 | Knight .......................... | 273/359 |
| 4,515,374 A * | 5/1985 | Herren, Jr. .................... | 273/359 |
| 4,548,414 A * | 10/1985 | Denis ............................. | 273/367 |
| 4,981,302 A * | 1/1991 | Narramore .................... | 273/339 |
| 5,233,780 A | 8/1993 | Overholt | |
| 5,377,439 A | 1/1995 | Roos et al. | |
| 5,775,698 A * | 7/1998 | Jones et al. ................... | 273/359 |
| 5,848,791 A * | 12/1998 | Beyer et al. ................... | 273/359 |
| 5,947,477 A * | 9/1999 | Turnipseed ................... | 273/407 |
| 6,079,140 A | 6/2000 | Brock | |
| 6,574,902 B1 | 6/2003 | Conger | |

(Continued)

OTHER PUBLICATIONS

The Design of System for Unmanned Driving Target Car; Yonghong Hu ; Xiaolin Zhang; Intelligent Systems and Applications, 2009. ISA 2009. International Workshop on; Digital Object Identifier: 10.1109/IWISA.2009.5073179; Publication Year: 2009 , pp. 1-4.*

(Continued)

Primary Examiner — Cuong H Nguyen
(74) Attorney, Agent, or Firm — Ronald R. Kilponen

(57) ABSTRACT

The present device relates to a remote control target supporting device, and in particular to a device with an improved chassis and decoy supporting features. According to one embodiment of the present device, the device has a frame with multiple pieces that is selectedly extendable and retractable along a central longitudinal axis. A front axle is connected to the front of the frame, and is fully swivel-able relative thereto. The front axle supports turnable wheels and a steering controller. A motor assembly, power supply and receiver are at the rear of the frame with a rear axle that supports the rear wheels. Preferably two target connectors are provided, and are movably supported by the frame. The target connectors have at least one vertically mounted rod upon which decoys or targets can be mounted in virtually any angle or presentation to the shooter. Additional attachment embodiments are disclosed to affix a greater variety of targets and other functional devices such as dump boxes and others for loading and hauling materials.

19 Claims, 17 Drawing Sheets

(56) References Cited

U.S. PATENT DOCUMENTS

| | | | | |
|---|---|---|---|---|
| 7,052,012 | B2 * | 5/2006 | Dehart | 273/406 |
| 7,469,902 | B1 * | 12/2008 | Hale | 273/359 |
| 7,681,886 | B2 * | 3/2010 | Morrow et al. | 273/366 |
| 7,900,927 | B1 * | 3/2011 | Bliehall | 273/359 |
| 7,984,910 | B1 * | 7/2011 | Nielsen | 273/359 |
| 2005/0124234 | A1 * | 6/2005 | Sells et al. | 440/33 |
| 2008/0088089 | A1 * | 4/2008 | Bliehall et al. | 273/359 |

OTHER PUBLICATIONS

Shooting Manipulation Inspired by Chameleon; Hatakeyama, T.; Mochiyama, H.; Mechatronics, IEEE/ASME Transactions on; vol. 18, Issue: 2; Digital Object Identifier: 10.1109/TMECH.2012.2225110; Publication Year: 2013, pp. 527-535.*

Steering Chain Hil Simulator for Steer-By-Wire Systems; Bernard, Carlo; Bolognani, S.; Peretti, L.; Zigliotto, M.; Power Electronics and Motion Control Conference, 2006. EPE-PEMC 2006. 12th International Digital Object Identifier: 10.1109/EPEPEMC.2006.4778664; Publication Year: 2006, pp. 1784-1789.*

Virtual archery with tangible interaction; Thiele, S.; Meyer, L.; Geiger, C.; Drochtert, D.; Woldecke, B.; 3D User Interfaces (3DUI), 2013 IEEE Symposium on; Digital Object Identifier: 10.1109/3DUI.2013.6550199; Publication Year: 2013, pp. 67-70.*

On the accuracy of the single-shot two-dimensional angular dispersion measurement; Borzsonyi, A. et al.; Lasers and Electro-Optics Europe (CLEO EUROPE/IQEC), 2013 Conference on and International Quantum Electronics Conf.; Digital Obj. Id: 10.1109/CLEOE-IQEC.2013.6801178; Pub. year 2013, p. 1.*

* cited by examiner

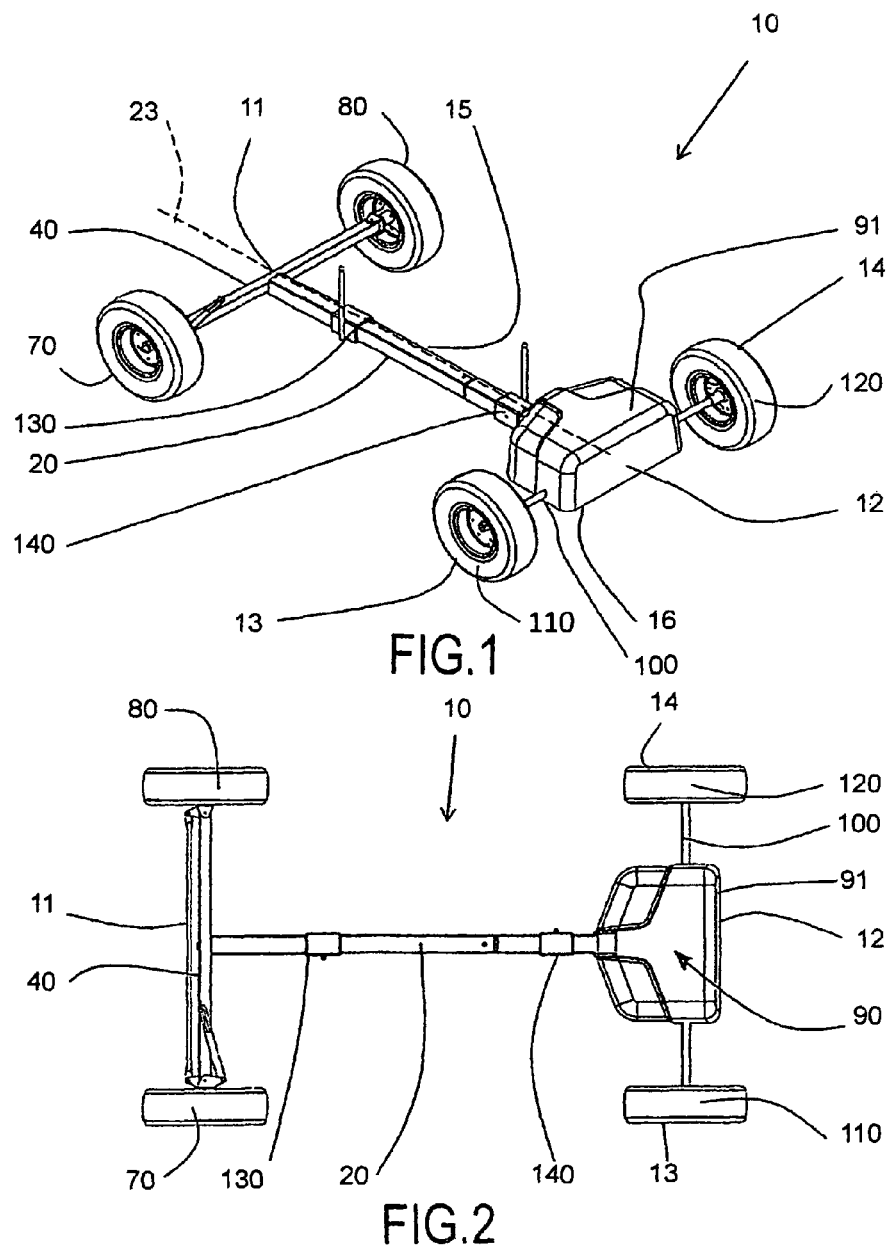

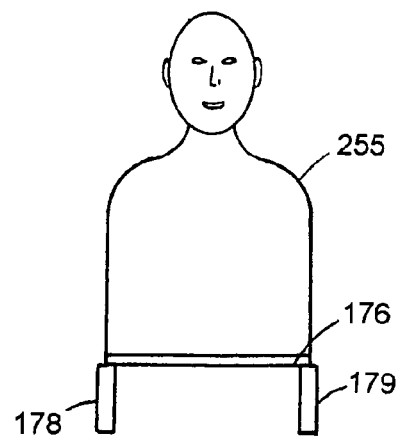
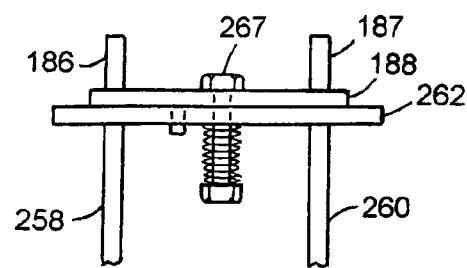
FIG.23
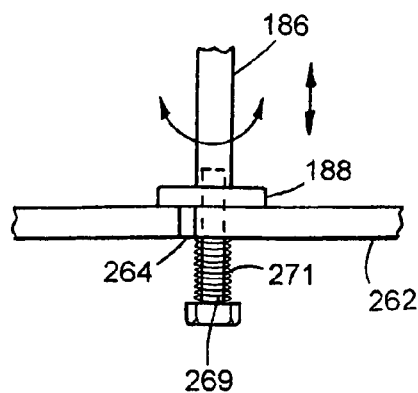
FIG.24

REMOTE CONTROLLED TARGET SUPPORTING DEVICE AND CARGO CARRIER

CROSS REFERENCE TO RELATED APPLICATIONS

This application claims the benefit of Provisional application for Patent Ser. No. 61/377,687 with filing date of Aug. 27, 2010.

BACKGROUND

1. Field of Disclosed Embodiments

The present device relates to a remote control target supporting device or remote controlled electric vehicle, and in particular to a device with an improved chassis that is functional with a 3-D big game target and virtually any target and decoy or target supporting features.

2. Description of the Background Art

Hunting or shooting of any type of projectiles, marksmanship, athletics and training for these activities are popular sports. Many if not most hunters spend a great deal of time practicing their sport. In the most basic set up, a hunter, for example a bow and arrow hunter, aims and releases the arrow toward a stationary target such as a bale of hay. While effective at improving skills at certain generic distances, this practice method does not lend itself well to altering terrain and moving targets. Further, this practice method does not provide practice in conditions such as from a particular tree stand.

Hunters can and do spend much time effort and planning in hunting game especially deer. Deer and other game do not always stop at the practiced shooting distance nor do they stand for a long time if at all. The hunter can be forced to take a less than "perfect" shot or a shot other than the shot(s) that had been practiced. This device allows hunters to practice those less than perfect shots to improve their hunting success.

Several inventions have been made over the years, some of which include: U.S. Pat. No. 3,689,927 to Boston titled Radio-Controlled Decoy. This patent shows a water fowl decoy containing a radio receiver adapted to receive signals from a remote radio transmitter. The receiver connects to an amplifier, one or more servos and other components within the decoy. A rudder operable by a servo steers the decoy. An electric motor drives a propeller to motivate the decoy. A folded or recessed grapple is extended when a servo mechanism within the decoy responds to a signal from the transmitter through the receiver. The decoy carries a battery pack and internal flotation.

U.S. Pat. No. 5,377,439 to Roos et al. is titled Remote Controlled Decoy. This patent illustrates a remotely controlled floating decoy having a buoyant body resembling a game bird and having a receiver disposed within the buoyant body. The receiver is responsive to commands from a transmitter and provides electrical control signals to a plurality of servo-mechanisms and associated linkages in response to the commands. The apparatus also has a propulsive device coupled to the buoyant body and electrically coupled to the receiver. The propulsive device is responsive to the electrical control signals. The apparatus also has a rudder coupled to a rear end of the buoyant body. The rudder is responsive to the electrical control signals. The propulsive device and the rudder cooperate to provide directed locomotion for the buoyant body in response to commands transmitted from the transmitter.

U.S. Pat. No. 6,574,902 to Conger is titled Apparatus for Simulating the Movement of an Animal. This patent shows a decoy apparatus that provides simulated walking movement of an animal along a path defined by a track. A carrier on the track supports the decoy and a motive device moves the carrier back and forth. A reversing mechanism in the form of a pulley on the carrier causes the decoy to face in the proper direction. The motive device includes first and second lines extending along the track. A spring driven spool tensions and provides the differential pulling force for the first line; the second line being similarly manually operated. A decoy attachment post includes a coil spring for creating a bobbing action. The track is an I-beam that hinges in the middle for transport. In an alternative embodiment, an electronic remote control circuit is provided. A related method of operating a decoy for walking movement in response to a motive force and reversing action is included.

None of this art teaches a remote controlled wheeled structure for supporting a target. None of this art shows a chassis with a fully swiveling front axle.

None of this art shows a frame that can be selectedly extended and retracted.

None of this art shows a chassis that supports a 3-D big game target, virtually any target and decoy on opposed sides of a central axis.

None of this art shows a zero to one hundred eighty degree locking target holding device for use with virtually any existing targets.

None of this art shows the ability to haul or transport cargo or gear while in the field or indoor areas to a variety of ranges and distances.

Thus there exists a need for a remote control target supporting device or remote controlled electric vehicle (RCEV) that solves these and other problems. The applicant has designed an attachment that allows a user to mount the target perpendicular to the unit so, for example, in an indoor or outdoor shooting ranges the units long side can be operated in forward and reverse. When multiple shooters are in the range, they do not have to cross the fire line to retrieve their targets for inspection or competition scoring.

SUMMARY

The present embodiments relate to a remote control target supporting device, and in particular to a device with an improved chassis and decoy supporting features. According to one embodiment of the present device, the device has a frame with multiple pieces that is selectedly extendable and retractable along a central longitudinal axis. A front axle is connected to the front of the frame, and is fully swivel-able relative thereto. The front axle supports turnable wheels with a steering controller. A motor assembly and receiver connected to the steering controller are at the rear of the frame. The rear of the frame supports rear wheels. Preferably two target connectors are provided, and are movably supported by the frame. The target connectors can have vertically mounted rods upon which removable decoys, targets and other target holders can be mounted.

According to one advantage of the present device, a remote controlled wheeled structure is provided. This advantageously allows either the hunter or another to move the device in the vicinity of a shooting location such as a tree stand. With this practice, the hunter can more accurately make shots from a particular location having practiced for such things as elevation and changes in the particular terrain and sudden movement or odd angles of the target.

According to another advantage of the present embodiments, the device has a chassis with a fully swivel-able front axle. This type of suspension allows the front wheels to better remain on the ground regardless of the terrain. This helps prevent tipping of the device and possible loss of drive power. According to a further advantage of the present embodiments, the frame can be selectedly extended and retracted to allow for greater customization of the decoy carrying device. This also aids in packing, transporting and storing the device.

According to a still further advantage of the present embodiments, the device has movable target connectors. This is accomplished in one embodiment by having target connectors that are movably positionable along the frame.

In one embodiment, the target connectors have rods that extend vertically from generally distances equal and opposite of the frame central axis so that the center of gravity of the decoy is approximately aligned with the center of gravity of the device to provide stability.

Other advantages, benefits, and features of the present embodiments will become apparent to those skilled in the art upon reading the detailed description of the device and studying the drawings.

BRIEF DESCRIPTION OF THE DRAWINGS

FIG. 1 is a perspective view of one embodiment of the Remote Controlled Target Supporting Device and cargo carrier.

FIG. 2 is a top view of one embodiment of the device illustrated in FIG. 1.

FIG. 23 shows another embodiment of a target and frame.

FIG. 24 a detailed view of the swivel feature of the embodiment shown in FIG. 23.

DETAILED DESCRIPTION

Figure 3:
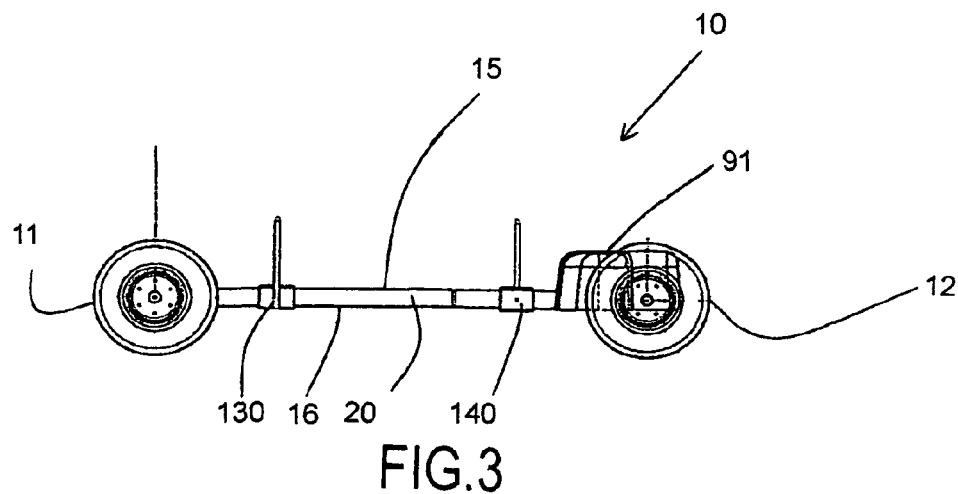
FIG. 3 is a side view of one embodiment of the device illustrated in FIG. 1.

While this device will be described in connection with one or more preferred embodiments, it will be understood that it is not intended to limit the device to those embodiments. On the contrary, it is intended to cover all alternatives, modifications and equivalents as may be included within the spirit and scope of the device as defined by the specification, drawings and appended claims.

Turning now to FIGS. 1-7, it is seen that a device 10 having a front 11, a back 12, opposed sides 13 and 14, a top 15 and a bottom 16 is provided. The device 10 generally has a frame 20, a front axle 40, a motor assembly 90, a rear axle 100 and two target connectors 130 and 140 respectively. Each of these components, and others, are described in detail below.

The frame 20 has a front 21 and a rear 22, and defines a longitudinal axis 23 along a central axis. The frame 20 has multiple parts, and preferably has a first piece 25 that is separated from a second piece 26 via an internal connector 27. The pieces 25 and 26 and connector 27 are preferably concentric with the longitudinal axis 23. It is also understood that the connector could be external of pieces 25 and 26 without departing from the broad aspects of the present device. Preferably, the first and second pieces are comprised of a rigid and strong material, such as aluminum or ferrous material. Yet, other materials could be used without departing from the broad aspects of the present device. The first and second pieces 25 and 26 are preferably tubular in nature, and preferably have a generally square shaped cross-sectional profile. The first piece 25 is connected to the second piece 26 via the connector 27. Extension of the frame 20 can be accomplished by moving the first and second pieced 25 and 26 apart and connecting them telescopically further away from each other to the internal connector 27.

A pivot adapter 30 is provided and is connected to the front 21 of the frame. The pivot adapter 30 has a body 31 that is preferably received within the front 21 of the frame 20, and also has a pin 32 that projects longitudinally outward form the first piece 25 of the frame. The pin is preferably concentric with the central longitudinal axis 23 of the frame 20.

The front axle 40 has opposed ends 41 and 42, a top, a bottom, a front and a rear. A pivot hole 43 passes through the front axle 40 between the front and rear, and is preferably centrally aligned through the axle. A top hole 44 is preferably located through the top and is offset toward but not at end 41 of the axle 40. Pin 32 is preferably received through pivot hole 43. The axle 40 can freely pivot or swivel about pin 32 and hence the frame 20 a full 360 degrees in a plane that is preferably perpendicular to longitudinal axis 23. Pivoting of the front axle 40 relative the frame 20 does not interfere with the orientation of the frame 20 relative to the ground, since the front axle 40 allows the front wheels 70, 80 to adjust in orientation relative to the frame to accommodate any changes in terrain.

A steering link 50 is also provided. The steering link 50 has ends 51 and 52, a pivot 53 near end 52 and a slot 54 intermediate the ends 51 and 52, FIG. 6. A pin can pass through slot 54 and into the top hole 44 of the front axle 40. The pin restricts the path of the steering link 50.

A steering rod connector 60 having ends 61 and 62 is provided between wheels 70 and 80. Wheel 70 has a connection assembly 71 connected to end 61 of the steering connecter rod 60 and connected to pivot 53 of the steering link 50. Wheel 80 has a connection assembly 81 connected to end 62 of the steering connector rod 60. The wheels 70 and 80, being mounted to a freely pivotal front axle 40, are free to also pivot around the longitudinal axis 23 of the frame 20. In this regard, the front wheels 70, 80 have a suspension that allow for both wheels to remain in contact with the ground while traversing uneven terrain.

A motor assembly 90 is located within a housing 91 at the rear of frame 20. The motor assembly 90 contains the drive components and communication components of the present device. Also included in the motor assembly 90 is a power source such as a battery, not shown. As the title implies, the motor assembly can receive instructions via a remote control to affect changes in forward and rearward movement and turns. A steering controller 55 interconnects to the wheels 70, 80 best shown in FIG. 12. Steering controller 55 also has a controller cable 56 that connects to the motor assembly 90 and receiver for transmitting control signals from the motor assembly 90 to the steering controller 55 to steer the device 10.

Figure 4:
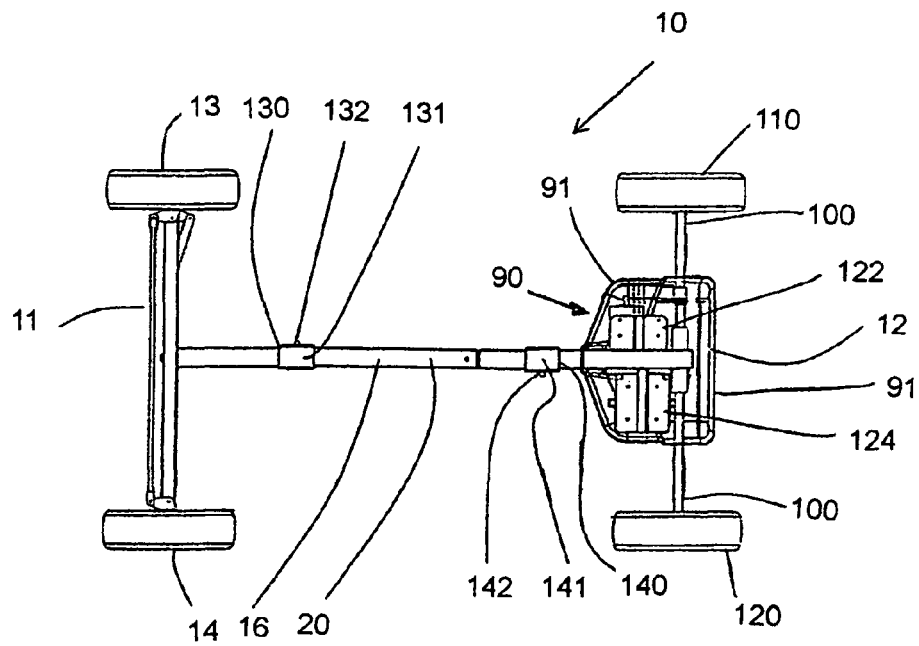
FIG. 4 is a bottom view of one embodiment of the device illustrated in FIG. 1.

FIG. 4 shows a first plate 122 and second plate 124 to which the power supply and motor assembly are attached. The first and second plates 122, 124 are located between the back or rear of the frame 20 and the rear axle 100.

Figure 5:
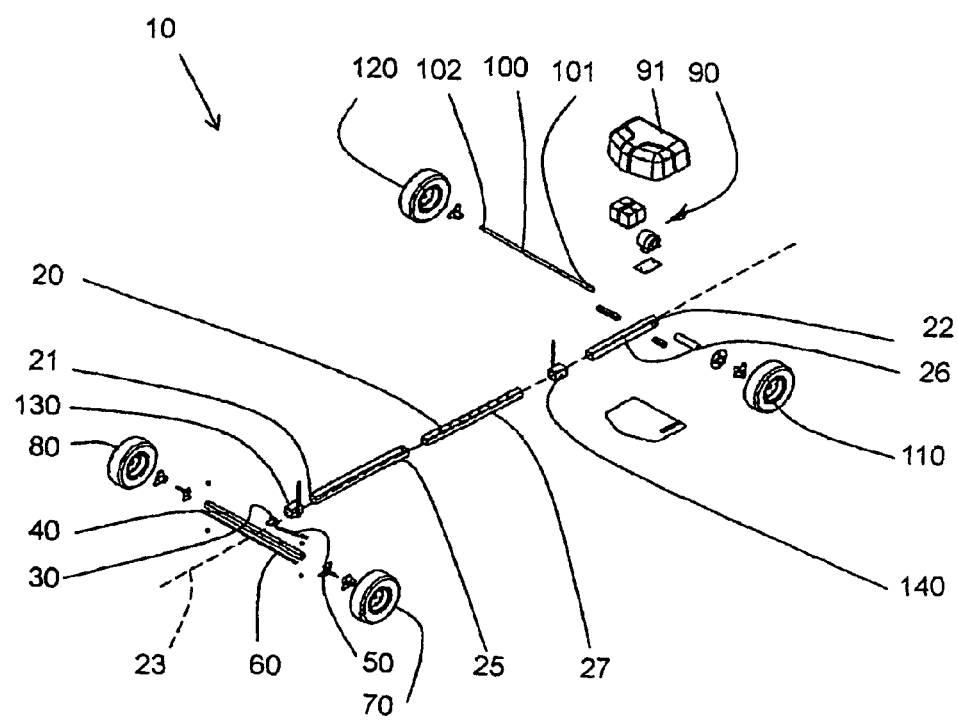
FIG. 5 is an exploded perspective view of one embodiment of the device illustrated in FIG. 1.

FIG. 5 shows a rear axle 100 with ends 101 and 102. A wheel 110 is supported by axle end 101 and a wheel 120 is supported by axle end 102.

Figure 6:
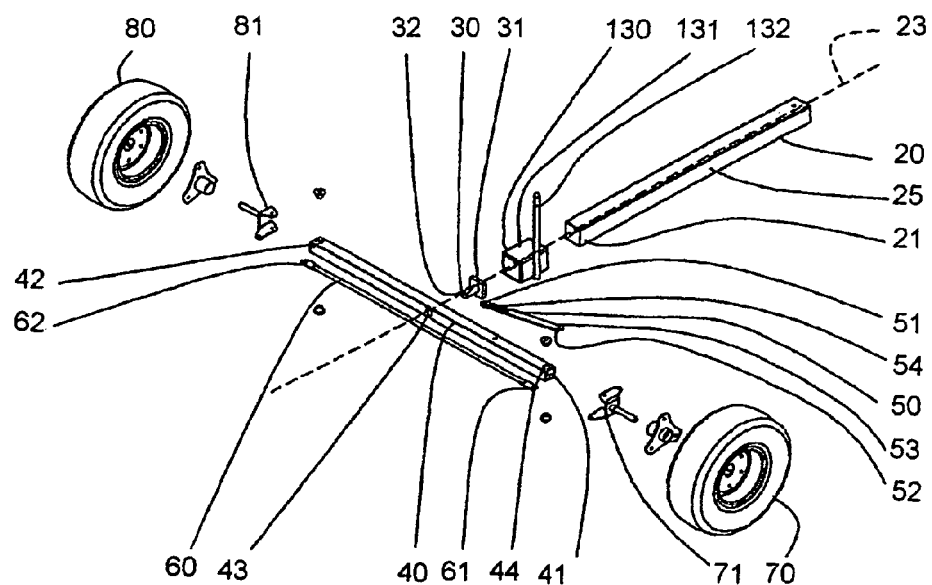
FIG. 6 is a close-up perspective view of one embodiment of the front axle of the device illustrated in FIG. 1.
Figure 7:
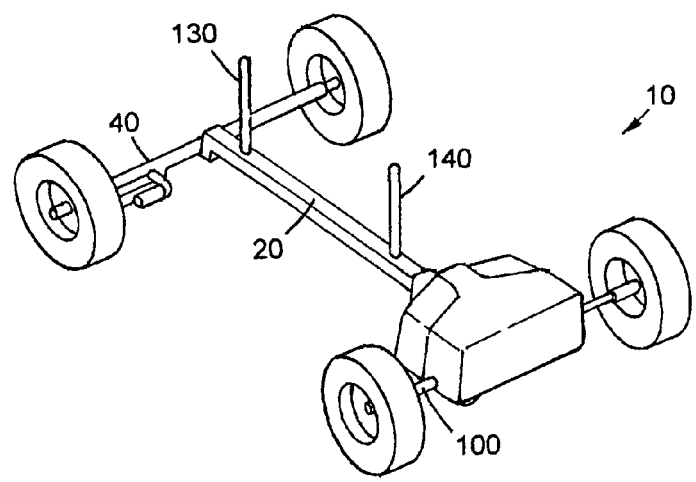
FIG. 7 is a perspective rendering of one embodiment of the device.

FIG. 6 shows a target connector 130 having a box 131 and a vertical rod 132. While a box is a preferred structure to movably connect the target connector 130 to the frame 20, it is understood that other methods and structures could be used without departing from the broad aspects of the present device. The box 131 preferably is similar in cross sectional profile with the frame 20. The polygonal nature (square in particular) of the frame and box prevent rotation of the target connector 130 relative to the frame 20, yet allows the connector 130 to axially move along the frame 20. A set screw of the like may be used to secure the target connector 130 in a desired position along the length of the frame 20. A rod 132 is also provided and extends vertically upward from the frame 20.

Likewise, target connector 140, FIG. 4, has a box 141 and a vertical rod 142. While a box is a preferred structure to movably connect the target connector 140 to the frame 20, it is understood that other methods and structures could be used without departing from the broad aspects of the present device. The box 141 preferably is similar in cross sectional profile with the frame 20. The polygonal nature (square in particular) of the frame and box prevent rotation of the target connector 140 relative to the frame 20, yet allows the connector to axially move along the frame 20. A set screw of the like may be used to secure the target connector 140 in a desired position along the length of the frame 20. A rod 142 is also provided and extends vertically upward from the frame 20.

It is understood that the distance between the connectors 130 and 140 can be determined by the user, and is adjustable to accommodate decoys or targets of differing dimensions. It is seen that rods 132 and 142 project vertically from opposing sides of the frame 20. This advantageously allows the approximate center of gravity of the decoy to be aligned with the center of gravity of the device 10. It is understood that a similar alignment of the center of gravity could be achieved by having the posts be geometrically aligned with the center of the tops of the boxes 132 and 141 respectively without departing from the broad aspects of the present device.

It is understood that the decoys or targets are removably supported by the device. It is also understood that the axles provide a wide stance for the device, which coupled with the pivoting or swiveling suspension of the front axle, provide great tipping resistance in the event that the decoy or target is struck by a projectile.

The wheels of the present device are preferably filled with foam or the like so as to avoid a flat tire situation.

The device 10 can be broken down easily for transport, and also easily assembled in the field. Such an advantage allows the device to be easily transported to and from a location such as a favorite hunting spot.

Figure 8:
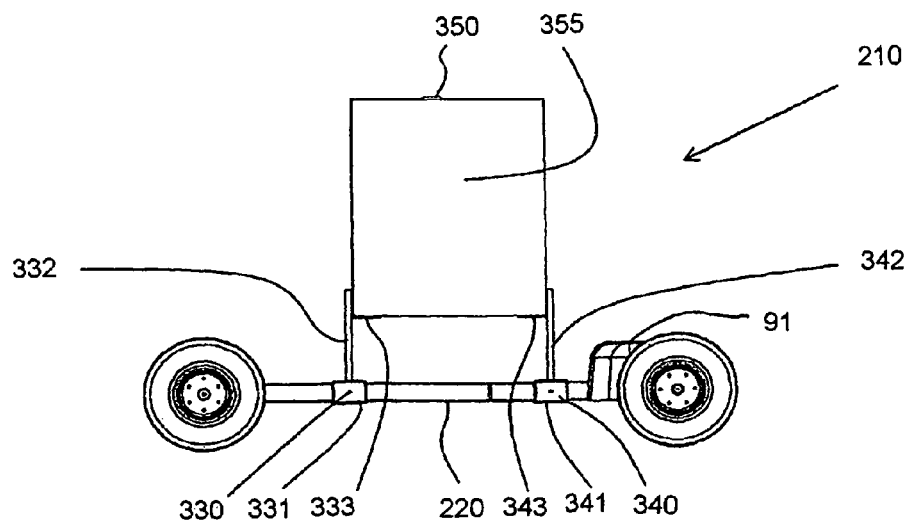
FIG. 8 is a side view of one embodiment of the present device with a target mounted.
Figure 9:
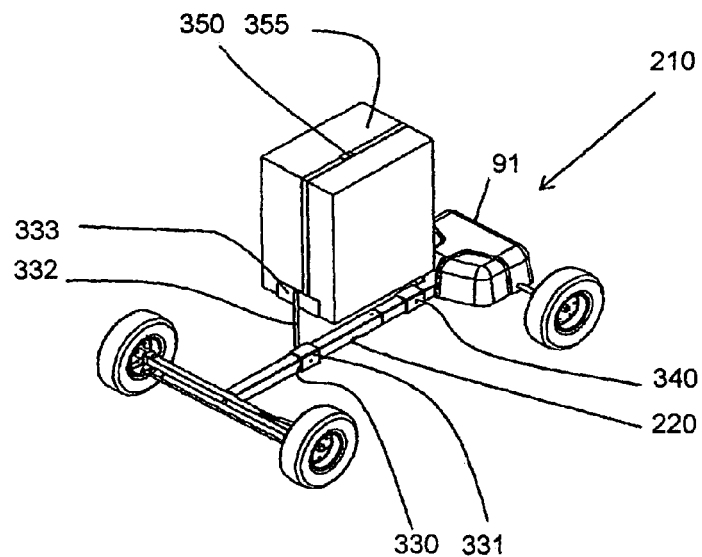
FIG. 9 is a perspective view of one embodiment of the device illustrated in FIG. 8.

Turning now to FIGS. 8 and 9, it is seen that an alternative embodiment is illustrated. The device 210 has a frame 220 with components similar to device 10 illustrated above.

The target connector 330 has a box 331 movable relative to frame 220 and a vertical rod 332. However, a seat 333 is received upon the top of the rod 332. The seat 333 has a vertical portion and a horizontal portion. Target connector 340 also has a box 341 movable relative the frame 220 and a vertical rod 342. A seat 343 having a vertical portion and a horizontal portion is received upon the rod 342.

The horizontal portions of the seats 333 and 343, respectively, are inwardly bound by the vertical portions, so that the seat can cooperate to form a base for a target 355 which can be bound with a strap 350 or other retaining device. A tensioner, such as a pull tensioner, can be provided to secure the target 355 upon the target connectors 330 and 340.

Figure 10:
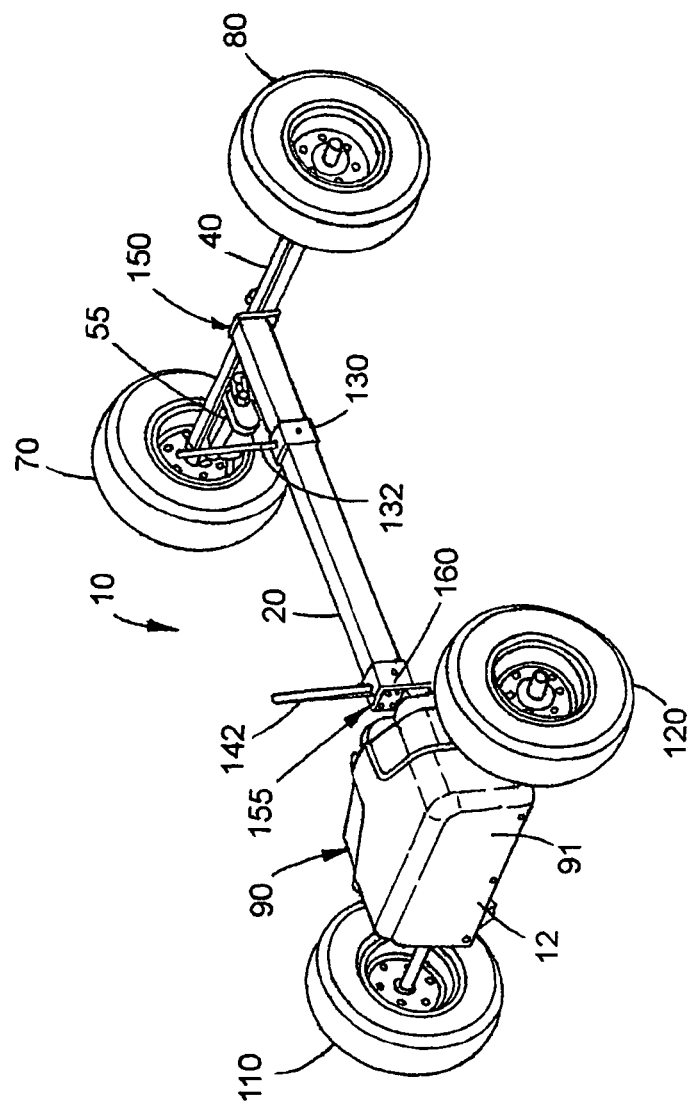
FIG. 10 shows a rear perspective view of another embodiment of the device.
Figure 11:
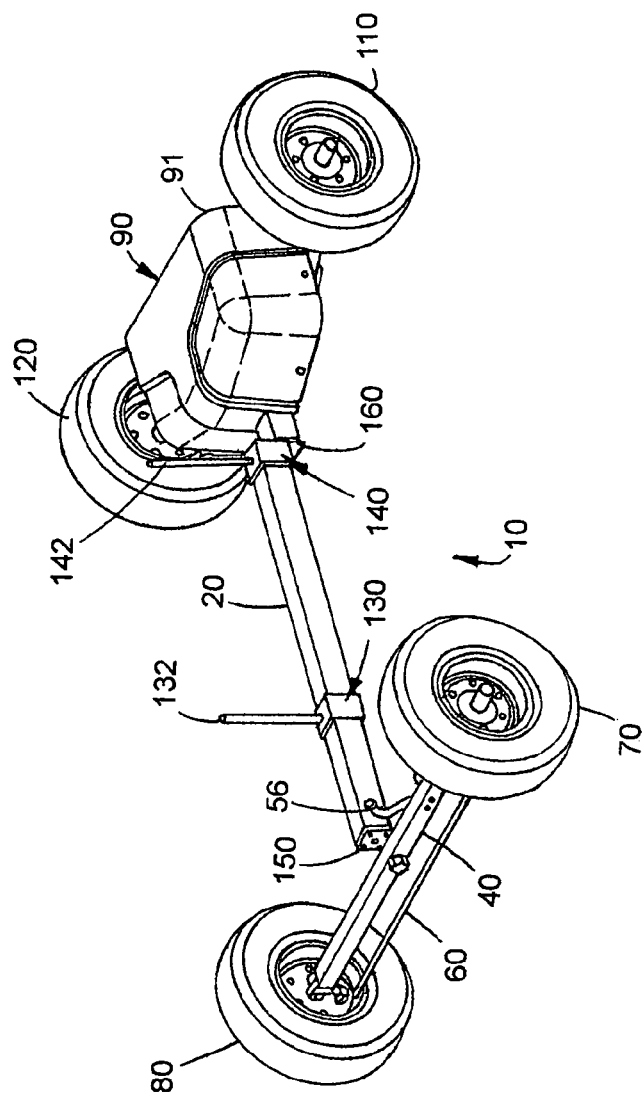
FIG. 11 shows a front perspective view of the embodiment in FIG. 10.
Figure 12:
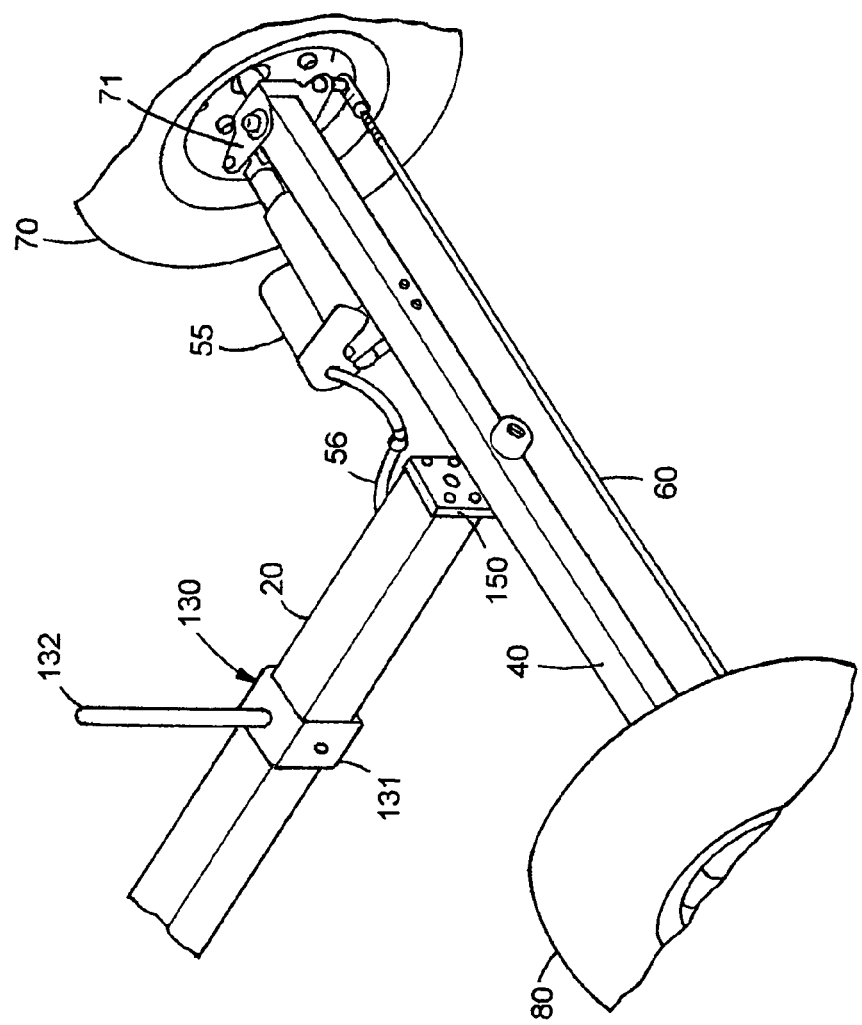
FIG. 12 shows a front perspective cut away view of one embodiment of the interconnection of the front axle and frame.

FIG. 10 shows another embodiment of the device 10. In this embodiment the front end of the frame 20 is connected to the front axle 40 with a pivot adaptor 150. The back end of the frame 20 is connected to the motor assembly 90 with a pivot adaptor 160. The pivot adaptors 150, 160 raise the frame 20 relative to the ground and the previous embodiments of the device 10. This elevation provides better ground clearance. FIG. 12 shows a partial cutaway view of the front of the frame 20 connected to the front axle 40 via the pivot adaptor 150. A steering controller 55 is shown that operates via the radio control transmitter (not shown) and receiver (not shown) located in the motor assembly 90 housing 91 via control cable 56. The control cable 56 runs from the motor assembly 90 and receiver in the interior of the frame 20 exiting near the pivot adaptor 150 to connect to the steering controller 55.

Figure 13:
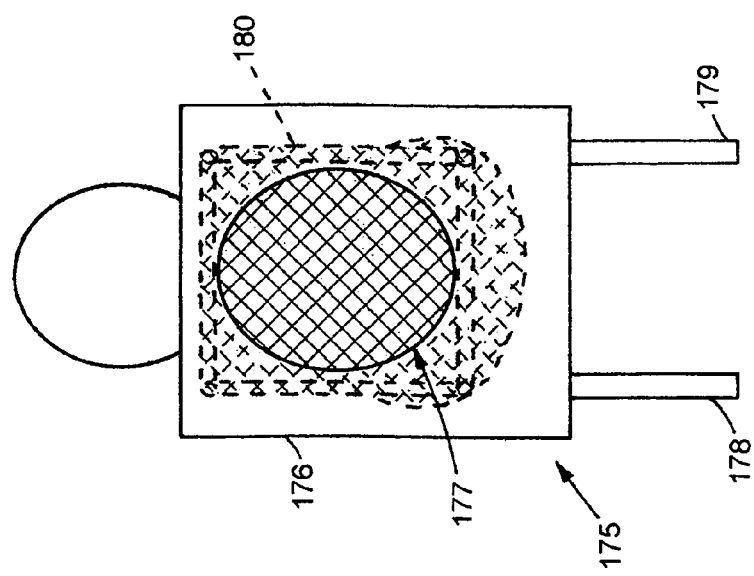
FIG. 13 shows a front view of one embodiment of the receiver target.

FIG. 13 shows one embodiment of a receiver target 175. The receiver target 175 emulates a football player and has a base 176 with a hole 177 where a quarterback would normally aim a pass to a receiver. First leg 178 and second leg 179 can be affixed to the vertical rods 132, 142 of the target connectors 130, 140.

Figure 14:
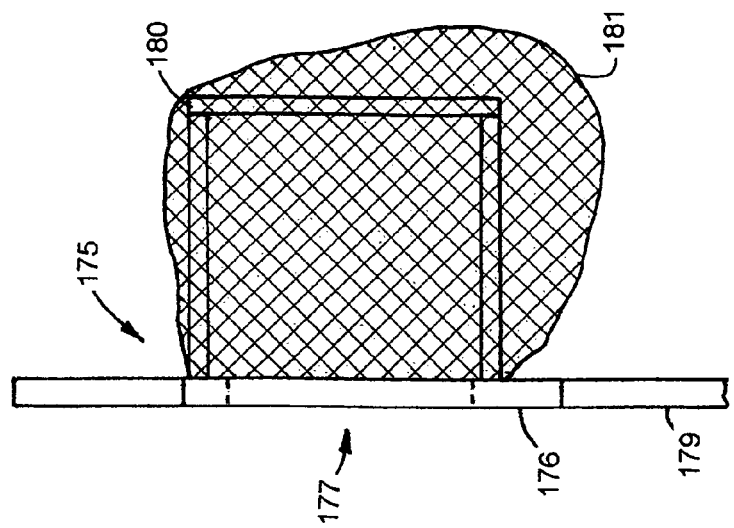
FIG. 14 shows a side view of one embodiment of the receiver target.

On the back of the receiver target 175 is attached a frame 180, FIG. 14. The frame 180 retains a bag 181. When the receiver target 175 is attached to the device 10 with a target mount 185, FIG. 17, a quarterback practicing passing can throw balls at the hole 177 where they are "caught" by the bag 181. This provides an efficient way for a quarter back to practice throwing balls while another party operates the radio transmitter to drive the device 10 and receiver target 175. FIG. 14 shows a side view of the receiver target 175 shown in FIG. 13.

Figure 15:
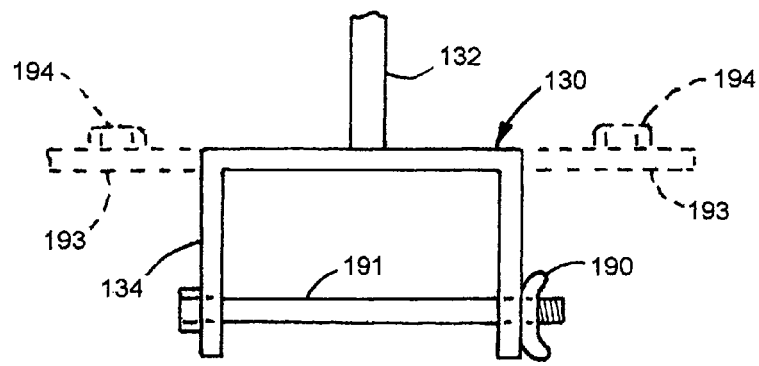
FIG. 15 shows a front view of one embodiment of the target connector.

FIG. 15 shows one embodiment of the target connector 130. In this embodiment there is a U-shaped section 134 that attaches to the vertical rod 132. Vertical rod 132 can either be welded to the U-shaped section 134 or there can be weld nuts 194 or other attachment method. A bolt 191 and wing nut 190 can be used to secure the target connector 130 to the frame 20 of the device 10. The bottom of the U-shaped section 134 can have extensions 193 on either or both sides with corresponding weld nuts 194 for moving the vertical rod 132. This allows greater flexibility to the types of targets that can be attached to the device 10 and allows potentially more mounting options.

Figure 16:
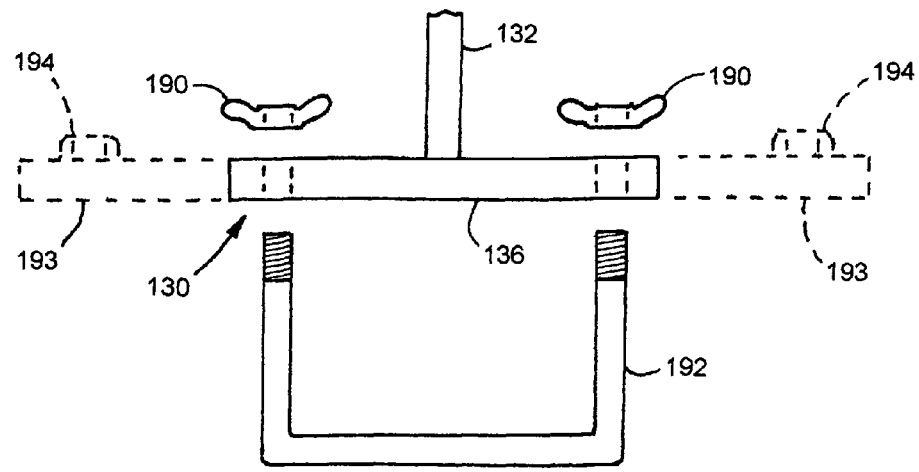
FIG. 16 shows a front view of another embodiment of the target connector.

FIG. 16 shows another embodiment of the target connector 130. In this embodiment there is a flat portion 136 to which is attached the vertical rod 132. The flat portion 136 is secured to the top of the frame 20 with u-bolt 192 and wing nuts 190. This embodiment can likewise have extensions 193 to which can be attached weld nuts 194 which allows either the vertical rod 132 to be moved or the attachment of additional vertical rods 132. This too provides greater flexibility to the types of targets that can be configured and affixed to the device 10.

Figure 17:
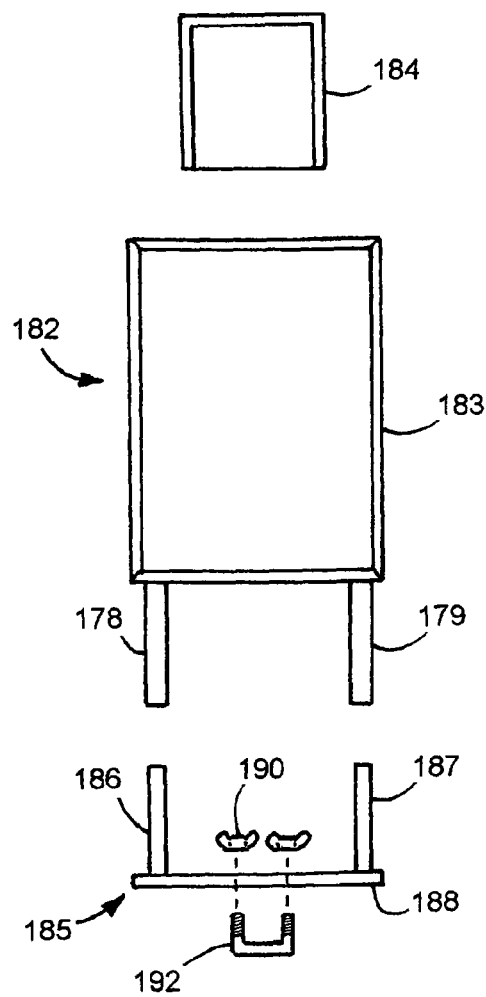
FIG. 17 shows a front view of one embodiment of a target frame.

FIG. 17 shows another embodiment of the target frame 182. The target frame 182 has a body frame 183 that is approximately a rectangle. A head frame 184 is secured to the body frame 183. A first leg 178 and second leg 179 are affixed to the body frame 183 on the end opposite the head frame 184. The first and second legs 178, 179 are slid onto a target mount 185, third leg 186 and fourth leg 187. The target mount 185 has a mount plate 188 to which are attached third leg 186 and fourth leg 187. Near the center of the mount plate 188 are a pair of holes which correspond to the legs of the u-bolt 192. The u-bolt secures the target mount 185 to the top of the frame 20 of the device 10 with wing nuts 190. When the target frame 182 is mounted to the target mount 185, the third leg 186 is housed within the first leg 178 and the fourth leg 187 is housed within the second leg 179. This allows removable attachment of the target frame 182 to the device 10.

The target frame 182 can have other targets attached to the body frame 183, head frame 184 or both. This allows a shooter to practice on a moving target that approximates the size of a human being.

Figure 18:
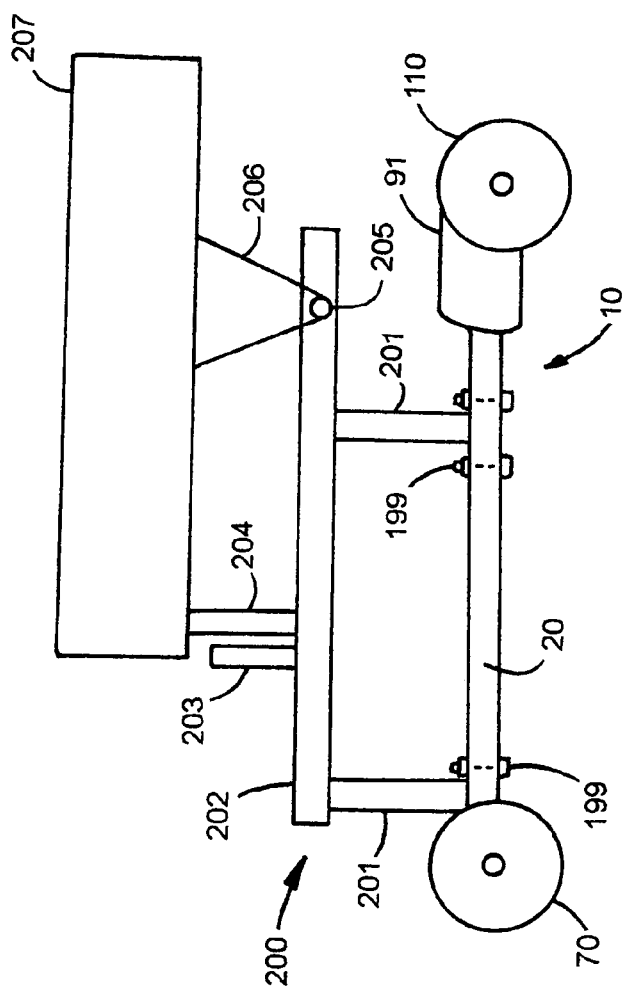
FIG. 18 shows a side view of one embodiment of a dump box and bucket frame attached to one embodiment of the device.

FIG. 18 shows one embodiment of the device 10 with one embodiment of a bucket frame 200 attached to the top of the frame 20 with, in this embodiment, bolts 199. The bucket frame 200 has a horizontal member 202 with two uprights 201 that secure the bucket frame 200 to the device 10. At the top of the bucket frame 200 horizontal member 202 is attached a release 203. The release 203 selectively engages the fore support 204 of the bucket 207. The bucket 207 can be loaded with materials or tools and the device 10 can be driven to a place of work or wherever the materials or tools are needed. If materials such as sand or dirt are needed to be moved, the device can be driven to where they are needed, the user can disengage the release 203 and the bucket 207 can be rotated manually around the pivot 205 such that the bucket 207 rotates toward the ground and the material will dump from the bucket 207. A pivot bracket 206 connects to the pivot 205 to allow the bucket 207 to rotate relative to the bucket frame 200.

Figure 19:
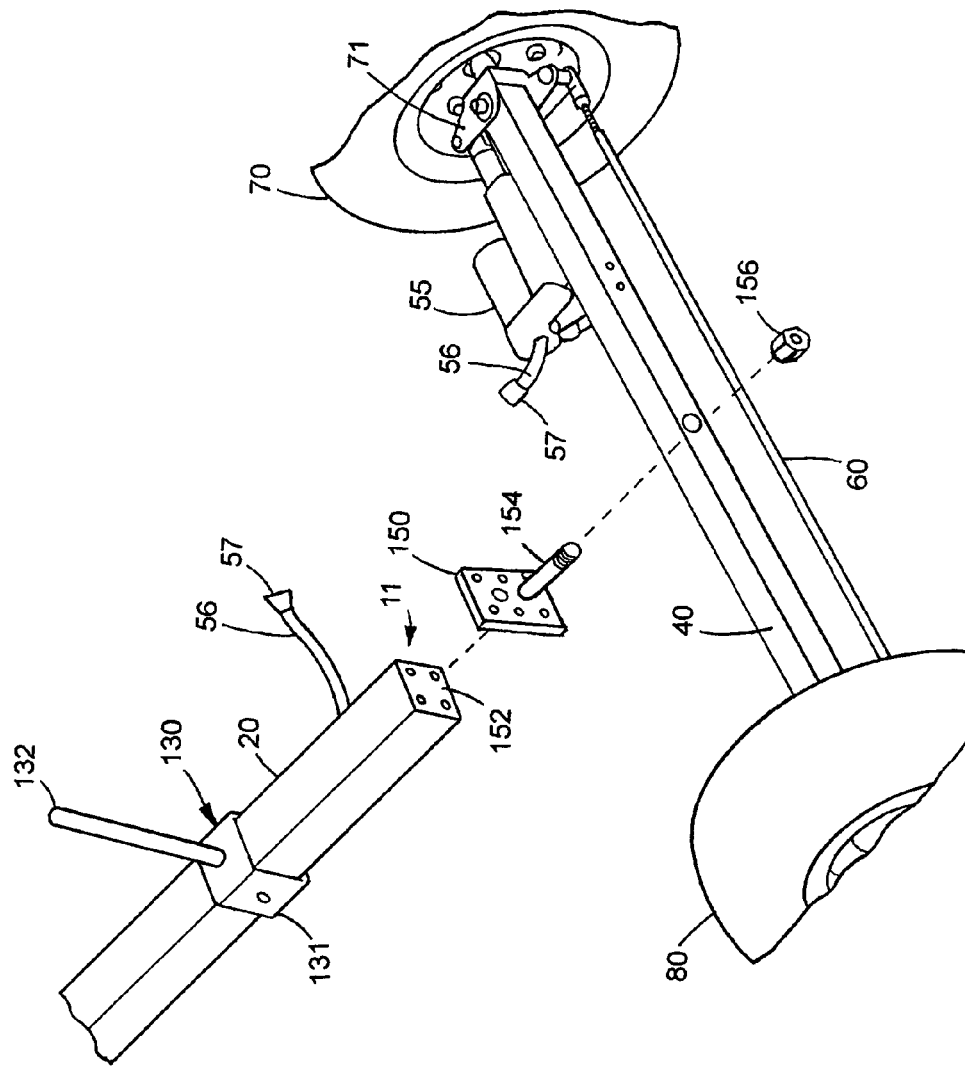
FIG. 19 shows an exploded perspective view of one embodiment of the front axle and related elements.

FIG. 19 shows an exploded view of the front axle 40 and adjacent elements. As can be seen from FIG. 19, the front 11 of the frame 20 houses pivot plate 152 having threaded holes. The pivot adapter 150 is bolted to the pivot plate 152. A post 154 extends from one side of the pivot plate 152 through the front axle 40 where it is secured with a fastener in this embodiment nut 156. The controller cable 56 has connectors 57 for disconnecting the control cable 56 from the front axle 40 and from the control cable 56 in the frame 20.

Figure 20:
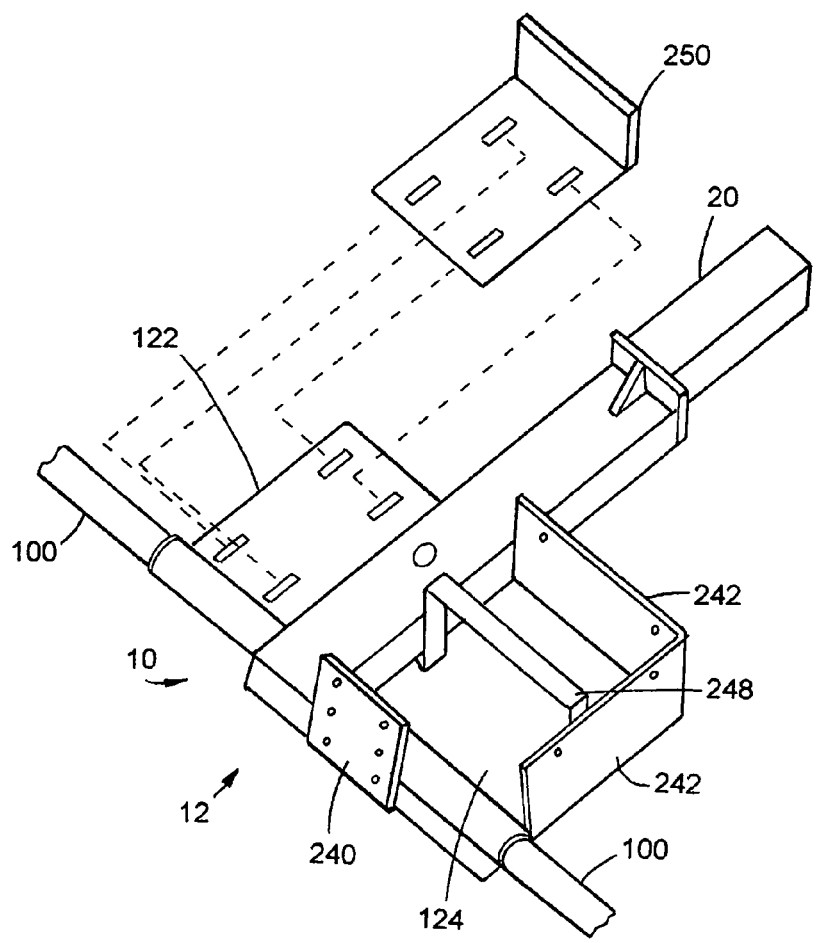
FIG. 20 shows a cut away perspective view of one embodiment of the back of the device with protective plating.
Figure 21:
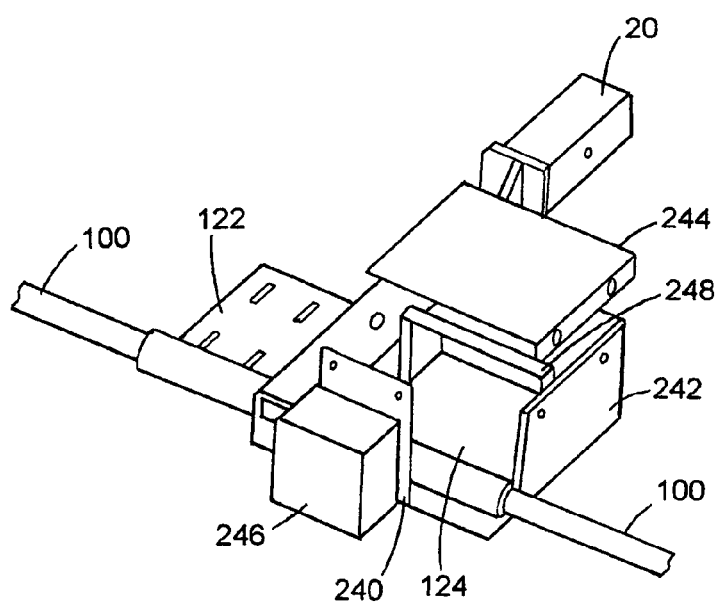
FIG. 21 shows a cut away perspective view of one embodiment of the back of the device with protective plating.

FIG. 20 shows a partial cut away perspective view of another embodiment of the back 12 of the device 10. In this embodiment, there is shown protective plating which surrounds the motor assembly 90 (not shown) and other components. The motor assembly 90 can be protected by side plates 242 and vertical plate 240. L-plate 250 can also be attached to protect elements on the other side of the frame 20. FIG. 21 shows more of the protective plating that protects the motor assembly 90 and other components. FIG. 21 shows a cover plate 244 that, in this embodiment, connects to the side plates 242 with fasteners and is further supported by support 248. Also shown in FIG. 21 is box cover 246 that attaches to vertical plate 240 with fasteners.

Figure 22:
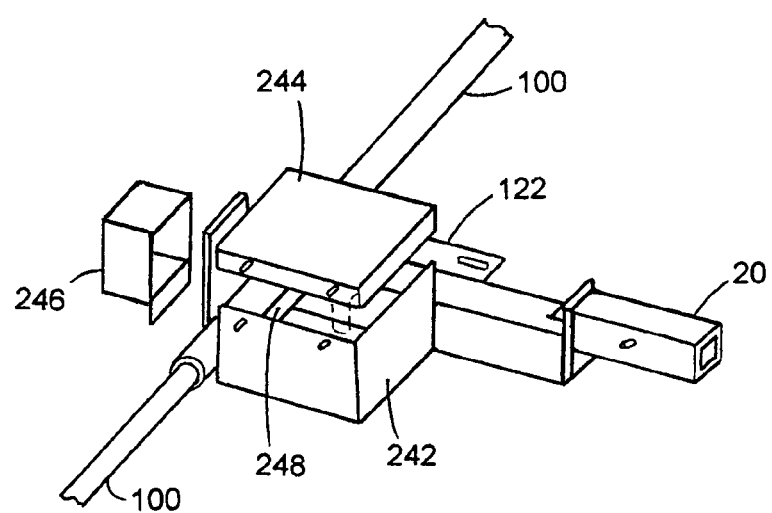
FIG. 22 shows an alternative cut away perspective view of one embodiment of the back of the device with protective plating.

FIG. 22 is another cutaway perspective view of the embodiments shown in FIGS. 20, 21.

FIG. 23 is another embodiment of a profile 255 or target having a base 176 connected to a first leg 178 and second leg 179. A mount plate 188 has corresponding third leg 186 and fourth leg 187. The mount plate 186 has a hole in the approximate middle through which a bolt 267 is inserted. The bolt 267 is also inserted through a hole in plate 262. A pin 264 is also affixed to mount plate 188 off set from bolt 267 and pin 264 extends from the bottom of mount plate 188. The plate 262 has a corresponding hole there through such that when inserted into and through plate 262, mount plate 188 and plate 262 are on atop the other. The plate 262 is attached to a fifth leg 258 and sixth leg 260 which are then attached to the vertical rods 132 of the target connectors 130, 140.

Below plate 262 and located around bolt 267 is spring 271. Spring 271 is retained in place by nut 269.

This allows the profile 255 to be retained in a position perpendicular to the longitudinal axis 23 of device 10. The user, by pushing up on nut 269 or alternatively pulling up on profile 255, can disengage pin 264 from plate 262. The profile 255 can then be rotated approximately 90 degrees. The profile 255 can then be released and lowered whereby the pin 264 is located adjacent to the outside edge of plate 262, as shown in FIG. 24. The result being that the profile 255 is now approximately parallel to the longitudinal axis 23 of device 10. This allows the device 10 to be driven parallel to the user practicing shooting. With the profile 255 approximately perpendicular to the longitudinal axis 23, the shooter can thereby practice shooting at a target that is approaching or moving away from the shooter.

Thus it is apparent that there has been provided, in accordance with the device, a remote control target supporting device that fully satisfies the objects, aims and advantages as set forth above. While the device has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the specification, drawings and broad scope of the appended claims.

What is claimed is:

1. A device for attaching targets for moving or stationary target practice, the device comprising:
   a frame having two ends, an axis parallel to the frame, a front axle attached perpendicular to one end of the frame, one wheel rotatably attached to each end of the front axle, a rear axle attached perpendicular to the other end of the frame, one wheel rotatably attached on each end of the rear axle;
   a motor assembly, receiver and power supply, the motor assembly and receiver attached to a first plate, the power supply attached to a second plate, the first and second plates located between the rear axle and frame, the motor assembly, receiver and power supply providing motive power to at least one of the rear wheels;

a steering link attached to each of the front wheels, the steering link attached to a steering controller, the steering controller attached by a control cable to the receiver, the steering controller used to steer the device relative to input from the receiver;
at least one target connector slidably attached to the frame, each target connector having at least one vertical rod;
a target removably attachable and detachable to at least one of vertical rods; and
a radio controller for communicating with the steering controller and the motor assembly to control the steering and speed of the motor.

2. The device of claim 1, wherein:
two target connectors connected to the frame.

3. The target of claim 1, further comprising:
a first vertical rod connected to a seat, a second vertical rod connected to a second seat, the first and second vertical rods placed over the each vertical rod of the target connectors, a strap for holding the target to the seats.

4. The target connector of claim 1, further comprising:
a u-shaped section with the vertical rod attached at the bottom of the U, a bolt affixed between each leg and attached with a wing nut, the u-shaped section sized to fit around the frame, whereby the bolt is tightened to affix the target connector to the frame.

5. The target connector of claim 1, further comprising:
a flat portion having a hole near each end, the vertical rod attached to one side of the flat portion, a u-bolt attached to the holes near each end of the flat portion with wing nuts, the u-bolt sized to fit around the frame, whereby the u-bolt is tightened to affix the target connector to the frame.

6. The target connector of claim 1, further comprising:
a fifth leg and a sixth leg attached to a plate, the plate having two holes, a mount plate attached to the plate with a bolt, a pin attached to the mount plate, a spring located around the bolt and retained with a nut, the spring retained between the nut and the plate, a third leg and a fourth leg attached to the mount plate for receiving a first leg and a second leg, the first and second leg attached to a base, the base attached to a profile, the fifth and sixth legs attached over the rods of the target connectors, the profile rotatable around the bolt whereby the profile can be located parallel and perpendicular to the frame.

7. A device for attaching targets for moving or stationary target practice, the device comprising:
a frame, a front axle attached to one end of the frame, the front axle connected to the frame with a pivot adapter, one wheel rotatably attached to each end of the front axle, a rear axle attached to the other end of the frame, the rear axle attached to the frame with a pivot adapter, one wheel rotatably attached to each end of the rear axle;
a motor assembly and receiver attached to a first plate, a power supply attached to a second plate, the first plate and second plate located between the rear axle and the frame one on each side of the frame, the motor assembly, receiver and power supply for providing motive power to at least one of the rear wheels;
a housing covering the motor assembly, receiver and power supply;
a steering link attached to each of the front wheels, the steering link attached to a steering controller, the steering controller used to steer the device;
the steering controller attached by a control cable to the receiver;
a target removably attachable and detachable to the frame; and
a radio controller for communicating with the steering controller and the motor assembly to control the steering and the speed of the motor.

8. The target of claim 7, further comprising:
a first leg and a second leg, the first and second legs attached to a body frame, the body frame attached to a head frame,
a third and fourth leg, the third and fourth legs attached to a mount plate, the mount plate having at least two holes, a u-bolt and wing nuts securing the mount plate to the frame of the device.

9. The target of claim 7, further comprising:
a first leg and a second leg, the first and second leg attached to a base, the base having a hole, a frame attached to the rear of the base, the frame retaining a bag, the bag covering the hole, a third leg and a fourth leg attached to a mount plate, the mount plate having two holes, a u-bolt removably affixed in the two holes, the u-bolt sized to fit around the frame, the u-bolt secured to the frame with wing nuts.

10. The target of claim 7, further comprising:
a fifth leg and a sixth leg attached to a plate, the plate having two holes, a mount plate attached to the plate with a bolt, a pin attached to the mount plate, a spring located around the bolt and retained with a nut, the spring retained between the nut and the plate, a third leg and a fourth leg attached to the mount plate for receiving a first leg and a second leg, the first and second leg attached to a base, the base attached to a profile, the fifth and sixth legs attached to the rods of the target connectors, the profile rotatable around the bolt whereby the profile can be located parallel and perpendicular to the frame.

11. The device of claim 7, further comprising:
a pair of side plates attached to the second plate, a cover plate attached to the side plates, the plates for protecting the motor assembly.

12. The device of claim 7, further comprising:
an L-plate, the L-plate attached to the first plate, the L-plate providing protection to the power supply.

13. A device for attaching targets for moving or stationary target practice, the device comprising:
a frame, the frame having a front and a rear, a front axle attached approximately perpendicular to front of the frame, the front axle connected to front of the frame with a pivot adapter, one wheel rotatably attached to each end of the front axle with a connection assembly;
a rear axle attached to the rear of the frame approximately parallel to the front axle, the rear axle attached to the frame with a pivot adapter, a first plate and second plate attached to the rear axle and rear of the frame, one plate on each side of the frame and, one wheel rotatably attached to each end of the rear axle;
a motor assembly and receiver attached to the second plate, a power supply attached to the first plate, the motor assembly, receiver and power supply interconnected and providing motive power to at least one of the rear wheels;
a steering link interconnecting the front wheels, the steering link attached to a steering controller, the steering controller attached to the front axle, the steering controller for steering the front wheels of the device;
the steering controller attached by a control cable to the receiver;
at least one target connector slidably attached to the frame, the target connector having at least one vertical rod;

a target removably attachable and detachable to the target connector; and a radio controller for communicating with the steering controller and the motor assembly to control the steering and speed of the device.

14. The device of claim 13, wherein:

two target connectors slidably connected to the frame.

15. The device of claim 13, further comprising:

a pair of side plates attached to the second plate, a cover plate attached to the side plates, the plates for protecting the motor assembly.

16. The device of claim 13, further comprising:

an L-plate, the L-plate attached to the first plate, the L-plate providing protection to the power supply.

17. The target of claim 13, further comprising:

a first leg and a second leg, the first and second legs attached to a body frame, the body frame attached to a head frame whereby the first and second legs are connected to the first and second vertical rods of the target connectors.

18. The target of claim 13, further comprising:

a first leg and a second leg, the first and second leg attached to a base, the base having a hole, a frame attached to the rear of the base, the frame retaining a bag, the bag covering the hole whereby the first and second legs are connected to the vertical rods of the first and second target connectors.

19. The target of claim 13, further comprising:

a fifth leg and a sixth leg attached to a plate, the plate having two holes, a mount plate attached to the plate with a bolt, a pin attached to the mount plate, a spring located around the bolt and retained with a nut, the spring retained between the nut and the plate, a third leg and a fourth leg attached to the mount plate for receiving a first leg and a second leg, the first and second leg attached to a base, the base attached to a profile, the fifth and sixth legs attached to the rods of the target connectors, the profile rotatable around the bolt whereby the profile can be located parallel and perpendicular to the frame.

* * * * *